Figure 1:
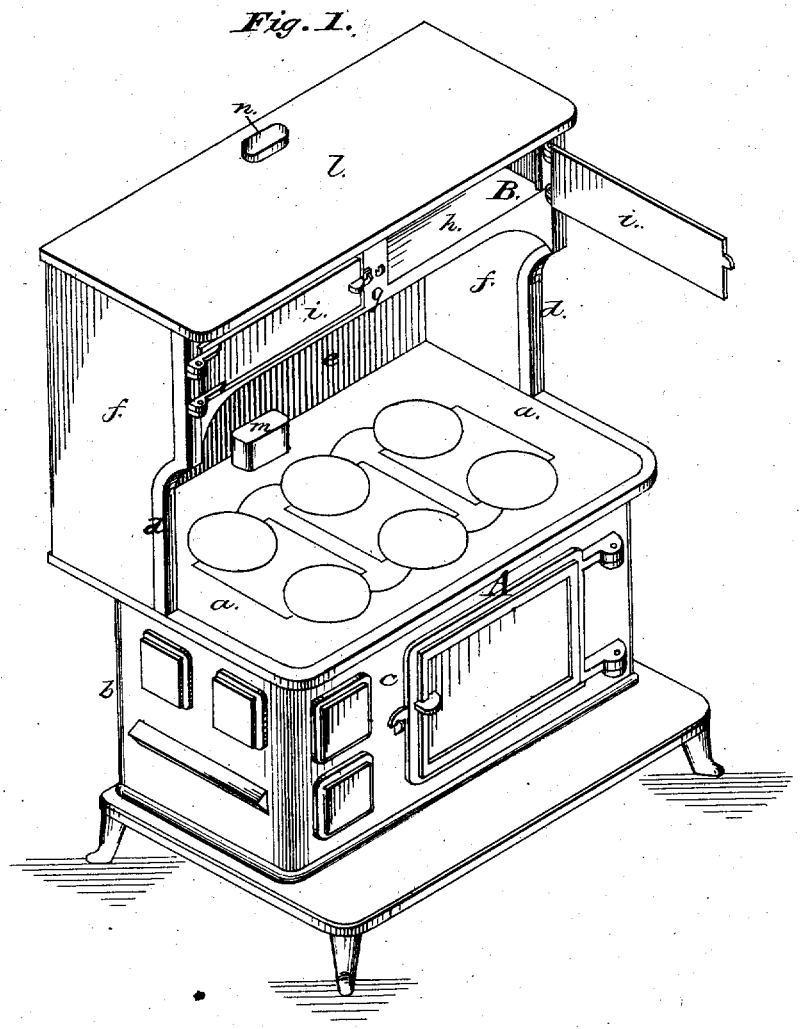

2 Sheets—Sheet 1

J. MAGEE.

Assignor to the MAGEE FURNACE Co.

Cooking-Range.

No. 8,330. Reissued July 9, 1878.

*Witnesses:*

T. C. Brecht.

Wm Beale Hale.

*Inventor:*

John Magee, by James L. Norris.

Attorney.

N. PETERS, PHOTO-LITHOGRAPHER, WASHINGTON, D. C.

J. MAGEE.

Assignor to the MAGEE FURNACE Co.

Cooking-Range.

No. 8,330. Reissued July 9, 1878.

Witnesses:
T. C. Brecht.
Wm Beale Hale.

Inventor:
John Magee,
by James L. Norris
Attorney.

N. PETERS, PHOTO-LITHOGRAPHER, WASHINGTON, D. C.

UNITED STATES PATENT OFFICE.

JOHN MAGEE, OF CHELSEA, MASSACHUSETTS, ASSIGNOR TO THE MAGEE FURNACE COMPANY.

IMPROVEMENT IN COOKING-RANGES.

Specification forming part of Letters Patent No. 129,416, dated July 16, 1872; Reissue No. 8,330, dated July 9, 1878; application filed June 20, 1878.

*To all whom it may concern:*

Be it known that I, JOHN MAGEE, of Chelsea, in the county of Suffolk and State of Massachusetts, have invented certain Improvements in Portable Ranges, of which the following is a full description, reference being had to the accompanying drawings, forming a part of this specification.

My invention consists in adapting an elevated hot-closet to a portable range; and in this new adaptation and use I seek not so much that which is absolutely new as a new form and adaptation of conveniences heretofore used in a more crude and expensive shape on brick-set ranges, &c.

The position of a hot-closet simply, either high up or low down, is not a proper subject of a patent, inasmuch as hot inclosures have been formed around, above, and below cooking stoves and ranges in many forms and shapes; but never until my present invention have they been elevated and made self-supporting upon the rear end or side of the stove-top; nor have they heretofore been made inclosed and detachable, nor of the form and shape here given.

My invention, therefore, consists in making a new form of hot-closet, and of supporting it upon the stove-top, and of making it removable and adjustable thereon, in such a manner that neither a brick-mason nor a tin-smith is required to set the stove up in the house where it is to be used. Any ordinary person can attach it, and it requires no other support except that which it receives from the stove-top itself, thus enabling the stove and closet to be carried from one room to another, or one house to another, so as to be used by people of limited means, making a new, cheap, and useful article of manufacture, not heretofore secured to our people.

Hot-closets heretofore, if made elevated above the stove, have been set in brick-work, and have, therefore, been expensive and incomplete of themselves. The stove or range with which they have been used could not, therefore, be moved from place to place, and therefore, by reason of expense and inconvenience, their use has been confined to the few who had houses adapted to their use and could afford them. Here, for the first time, all the convenience of an elevated hot-closet is secured, not only cheaply, but in such a convenient form that it can be moved and used in as many places, and with as little trouble and expense, as any ordinary stove.

I proceed to describe my invention in detail, that others skilled in the art may fully understand the same.

Figure 2:
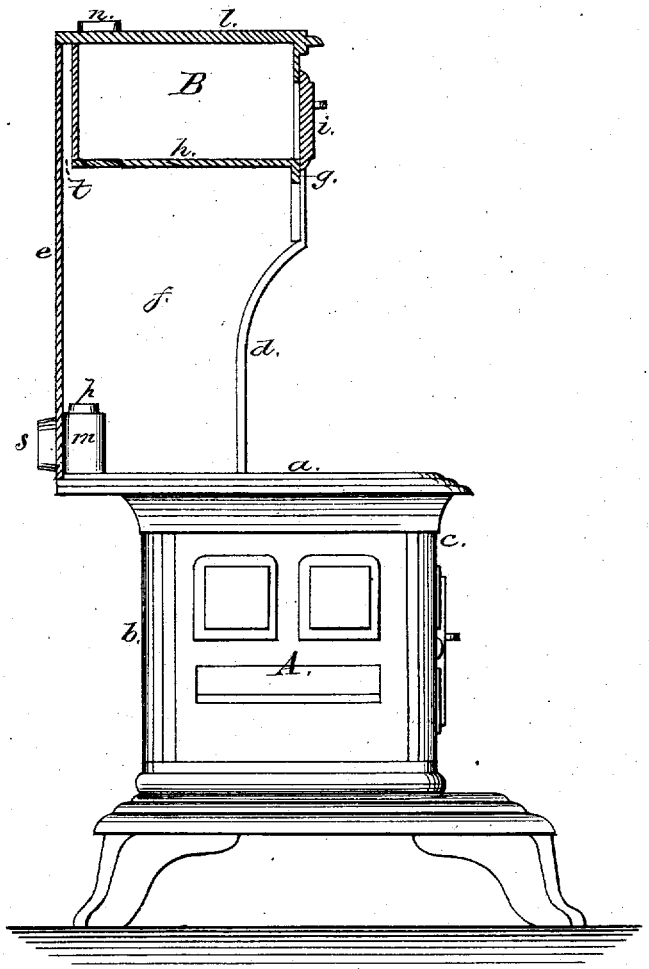

Figure 1 is a perspective view of a portable cooking-range having my improved hot-closet attached to the same. Fig. 2 is a sectional view, showing the form of the closet and its relative position as regards the stove itself.

In the drawing, A is a portable cooking-range or stove. The rear of the top plate *a a* is extended out so as to project over beyond the back *b* a distance considerably more than it does beyond the front of the stove, in order thereby to allow the hot-closet B to occupy a portion of the stove-top without being in the way of the boiler-holes.

The hot-closet rests upon the top plate *a a*, and is supported thereby, the top plate itself being fastened securely to the stove-body. The top plate of the range is provided with lugs, projecting up therefrom, for securing thereto the cast-iron standards *d d*, sheet-iron back *e*, and sheet-iron ends *f f*.

Extending between the cast-iron standards *d d* is a cast-iron front plate, *g*, to which is secured the front of a sheet-iron plate, *h*, forming the shelf or bottom of the closet B, the back of this plate *h* being riveted or otherwise fastened to the sheet-iron plate forming the back *e*, and the ends *f f*, which extend up from the top plate *a a* and serve, in connection with the standards *d d*, to support the closets.

The cast-iron front *g* of the closet is provided with one or more sliding or swinging doors, *i i*, which may be opened and shut to let out or retain the heat thereof; and the top *l* of the closet is also of cast-iron, and serves to hold the whole closet in a firm and true position.

The reason that it is preferred to make a part of the closet of sheet-iron is to make or produce an article still less in price, so as to reach the people at large, and afford a family of small means all the advantages of this invention. The closet is also lighter, and is therefore more easily supported on the stove-top.

The steam arising from articles being cooked on the stove-top may be allowed to escape through a tube or opening communicating with the flue.

If desired, a space or chamber, *t*, may be formed at the back and ends of the closet, (see Fig. 2,) whereby I am enabled to increase its heat.

The exit-flue of the range is at *m*, Fig. 2, and the smoke-pipe may go on the collar *r* or on the collar *p*, a removable cap being placed over the one not used.

When the opening of the flue in the chimney of the house where the stove is used is located higher up than the hot-closet B, the smoke-pipe may lead from the collar *p* up through the opening *n'* in its bottom and *n* in its top, the opening *n* being provided with a close-fitting cap, made removable for this purpose.

It is obvious that when the smoke-pipe passes through the closet considerable extra heat is secured and imparted to the same by reason of the passage of a live current of products of combustion from the stove below.

The front standards of the closet *d d* are curved backward, in order to get more room on the stove-top, and for symmetry and beauty of construction, thereby making the closet useful and graceful.

The heat arising from the stove-top is gathered by the sides *f f* and the back *e*, and is concentrated upon the plate *h*, thereby heating the closet more effectively.

It will be observed that this closet is not only detachable, but the stove may be used with or without it equally well, and the party who purchases one of these stoves need not buy the closet at the time of purchase, but may add it at any time thereafter as his inclination or means may allow.

Elevated ovens for baking purposes resting upon smoke-flues, and connected therewith by flues passing under and around the oven, have been made for many years. My invention is confined to an elevated self-supporting inclosure placed above the stove-top, which is neither heated nor used as an oven; nor is it constructed for baking purposes.

What I claim as my invention, and desire to secure by Letters Patent, is—

1. An elevated hot-closet for a portable range or stove attached to a stove and supported thereby.

2. For a cooking range or stove, an elevated hot-closet, adapted to be attached to the stove-top and supported thereon.

3. An inclosed elevated hot-closet, arranged to receive a smoke-pipe through the body thereof, for the purpose of heating the inclosed space therein, provided with a door or doors.

4. An elevated inclosed hot-closet having the lower portion of its two sides or ends recessed or curved backward from the main front thereof, thereby occupying less room on the stove-top, and adapted to be fastened thereto and supported thereby, substantially as shown herein and described.

5. A hot-closet for a cooking stove or range made in the form of an oblong box with a door or doors formed on one side thereof, in combination with downwardly-projecting supporting plates or pieces made to unite with the stove-top and to rest upon the outer edges of three sides thereof for the better support of the closet and a more perfect gathering of the heated air arising from said top, substantially as herein shown and described.

6. An elevated removable hot-closet to a portable range, made partly of cast-iron, and adapted to be attached to the range-top and made self-supporting thereby, said cast-iron giving the closet a more firm and steady support.

In testimony that I claim the foregoing I have hereunto set my hand in the presence of two witnesses.

JOHN MAGEE.

Witnesses:

ALBERT N. PARLIN,
EPH. L. HADAWAY.